March 15, 1932.  H. P. GROSSMAN  1,849,756
CORN GATHERER AND HUSKER
Filed Feb. 14, 1928  2 Sheets-Sheet 1
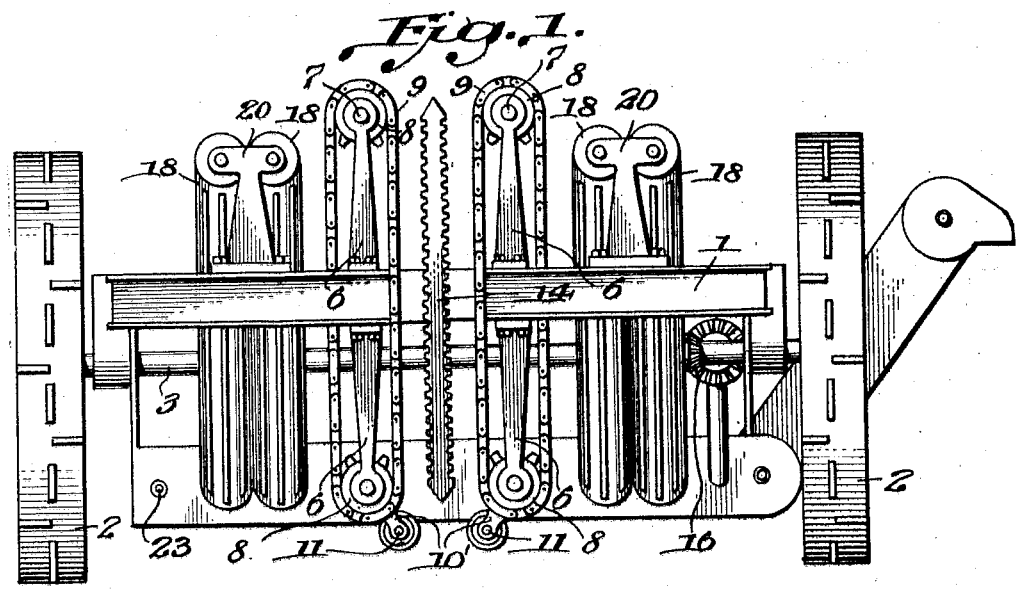
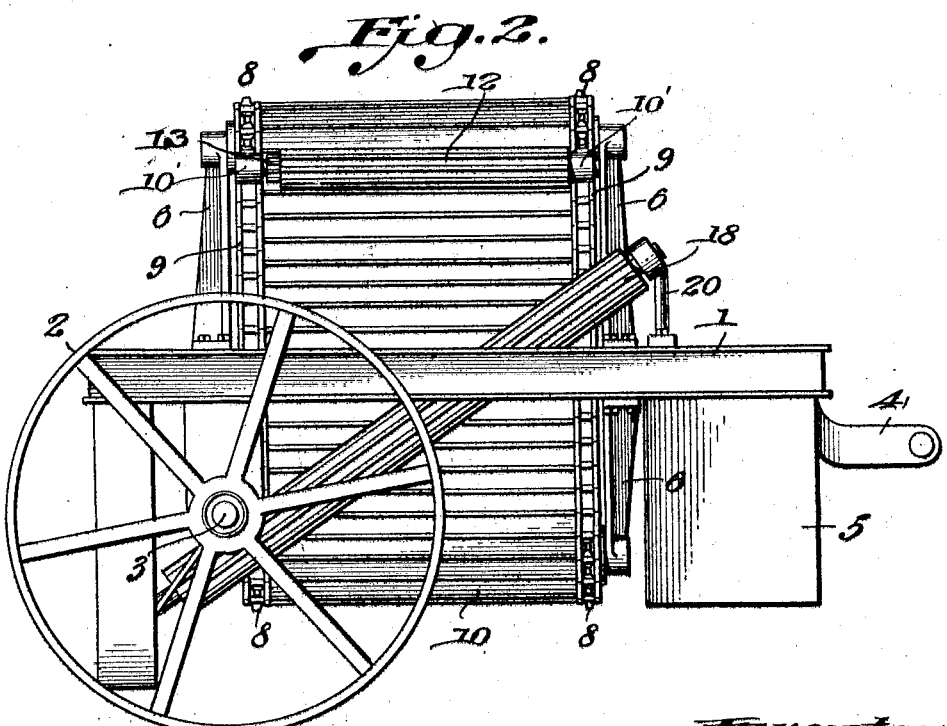

March 15, 1932.  H. P. GROSSMAN  1,849,756
CORN GATHERER AND HUSKER
Filed Feb. 14, 1928    2 Sheets-Sheet 2

Inventor,
Herman Peter Grossman

By          Atty.

Patented Mar. 15, 1932

1,849,756

UNITED STATES PATENT OFFICE

HERMAN PETER GROSSMAN, OF BOONVILLE, INDIANA

CORN GATHERER AND HUSKER

Application filed February 14, 1928. Serial No. 254,288.

This invention, which relates to an improved corn gatherer and husker, has the following objects: first, to provide an improved arrangement of elevators and snapping rolls in combination with means for their operation from the time they engage the growing stalks until they have snapped off the ears and thereupon to disengage said snapping rolls from the stalks; second, to provide husking rolls combined in an improved manner with the elevators and snapping rolls; third, to provide an improved combination of means for stripping or snapping the ears from the stalks, and husking rolls arranged to remove the husks from the ears after the latter have been snapped, and other means for conveying the snapped, husked, ears to one side of the machine for delivery into a suitable wagon drawn along therebeside.

My improvements enable the machine to remove all of the ears from growing corn, regardless of the height of the corn and of the nature of the undergrowth such as rag weeds, cockle burs, grass, etc. In my machine, the improved arrangement of snapping rolls and elevators enables the stalks to be engaged close down to the ground, with the foregoing improved results.

In the accompanying drawings:

Figure 1 is a front elevation, the converging guides being omitted;

Fig. 2 is a side elevation, one of the converging guides being shown;

Fig. 3 is a rear elevation, certain parts being omitted to disclose the gears; and Fig. 4 is a similar view, showing the complete machine.

The machine has a frame 1, which is open at the central part of its front, as shown in Fig. 1, to admit the growing corn stalks, and is carried by large ground wheels 2 whose axle 3 supplies the power for driving the parts of the machine as the machine is pulled along by any suitable means attached to the draw bar 4. The frame 1 has its corners suitably braced at the front.

Converging guides 5, depending from the front of the frame 1 are adapted to guide the corn stalks into the center line of the machine so that they will be in position to be operated on by the snapping rolls.

Journalled in standards 6 rising and depending from the frame 1 are shafts 7 which carry sprocket wheels 8 which engage chains 9 of slatted endless elevators 10.

The chains 9 carry bearings 10' for the shafts 11 of the snapping rolls 12, said rolls extending substantially the full length of the slats of the elevators and arranged opposite each other when travelling upwardly on the inner stretches of the elevators 10. Only one snapping roll 12 for each chain 9 is illustrated but it will be understood that a plurality of the rolls 12, regularly spaced, will be carried by each chain 9. Each roll is provided with a pinion 13, said pinions being adapted to engage with a double rack 14 secured to frame 1, right after the elevators have turned to bring the rolls 12 from the lowest point they assume, as shown in Fig. 1, into position to rise with the inner stretches of chains 9. The opposite ends of the rack 14 may be pointed to facilitate the meshing of the pinions with said rack and their disengagement from it when they have completed their upward travel. The elevators 10 are driven from a shaft 15 by gearing 16 operating on the lower shafts 7. The shaft 15 is driven from the axle or shaft 3 by sets of gears 16, 17. This shaft also drives the husking rolls 18 as seen in Fig. 3.

As the machine advances, the corn stalks are guided by the guides to a point where they are positioned for engagement by snapping rolls 12. The snapping rolls 12, starting with the lower parts of the stalks, travel upwardly and snap or squeeze off all of the ears on the stalks. The ears cannot escape or fall and are carried upwardly, on top of the snapping rolls and against the slats of the inner stretches of the elevators 10 until they are finally thrown laterally, in one direction or the other, onto the husking rolls, which appear at 18, when the snapping rolls 12 separate from each other at the upper ends of the travel of the chains 9. Any snapped ears that may fall through the space between these rolls, are caught by the rolls 12 just beneath, and the piling up of the ears causes them to eventually discharge onto the husking rolls 18.

The husking rolls 18 are arranged in pairs and are flanked by guides or partitions 19 (Fig. 4) which prevent the ears from falling off and insuring that the rolls husk them.

The husking rolls 18 are carried by shafts suitably mounted in bearings 20, said rolls being located in inclined relationship to a horizontal plane so that the husked ears will gravitate to a horizontally travelling endless conveyor 21 at the rear of the machine and be carried by it to an inclined endless conveyor 22 adapted to deliver the husked ears laterally to one side of the machine. A suitable wagon can be driven along to catch the husked ears. The conveyors 21 and 22 are driven at a suitable speed by shaft 23 which is geared to shaft 15 by a pair of bevel gears 24.

What I claim is:

1. In a corn gatherer and husker, the combination of endless elevators arranged beside each other and having parallel stretches adapted for upward travel, and rotatable snapping rolls respectively bodily carried by, and movable with, said elevators, said rolls by the travel of the elevators, being brought adjacent each other, thereupon to collectively and co-operatively engage the stalks and snap the ears therefrom by squeezing between them the stems of the ears during the upward travel of the endless elevators, the rolls and elevators co-operating to transport the ears after they have been snapped from the stalk.

2. In a corn gatherer and husker, the combination of endless elevators arranged beside each other and having parallel stretches adapted for upward travel, and rotatable snapping rolls respectively bodily carried by, and movable with, said elevators, said rolls by the travel of the elevators, being brought adjacent each other, thereupon to collectively and co-operatively engage the stalks and snap the ears therefrom by squeezing between them the stems of the ears during the upward travel of the endless elevators, the rolls and elevators co-operating to transport the ears after they have been snapped from the stalk, and husking rolls arranged in pairs alongside the respective elevators, to which the respective snapping rolls of each pair and their elevators deliver the snapped ears.

3. In a corn gatherer and husker, the combination with endless elevators arranged beside each other, and having parallel stretches adapted for upward travel, and rotatable snapping rolls carried by said elevators and bodily movable therewith, said snapping rolls by the travel of the elevators, being brought adjacent each other, thereupon to collectively and co-operatively engage the stalks and snap the ears therefrom by squeezing between them the stems of the ears during the travel of the elevators, said rolls and elevators being adapted to co-operatively transport the snapped ears, and means for rotating said snapping rolls brought into action only during that part of their bodily travel during which they are positioned by the movement of the elevators to snap the ears from the stalks and to transport them, said snapping rolls being idle during the remainder of their travel.

4. In a corn gatherer and husker, the combination with endless elevators arranged beside each other and having parallel stretches adapted for upward travel, and rotatable snapping rolls carried by said elevators and bodily movable therewith, said snapping rolls by the travel of the elevators, being brought adjacent each other, thereupon to collectively and co-operatively engage the stalks and snap the ears therefrom by squeezing between them the stems of the ears during the travel of the elevators, said rolls and elevators being adapted to co-operatively transport the snapped ears, means for rotating said snapping rolls during that part of their bodily travel during which they are positioned by the movement of the elevators to snap the ears from the stalk and to transport them, said snapping rolls being idle during the remainder of their travel, and husking rolls arranged in pairs alongside the respective elevators, to which the respective snapping rolls of each pair and their elevators deliver the snapped ears.

In testimony whereof I affix my signature.

HERMAN PETER GROSSMAN.